United States Patent
O'Neil et al.

(10) Patent No.: US 9,282,424 B2
(45) Date of Patent: Mar. 8, 2016

(54) METHOD AND SYSTEM FOR LOGIC-BASED UNIFORM RESOURCE LOCATOR RESOLUTION

(75) Inventors: Brian K. O'Neil, Austell, GA (US); Matthew Drooker, Atlanta, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 909 days.

(21) Appl. No.: 13/547,505

(22) Filed: Jul. 12, 2012

(65) Prior Publication Data

US 2014/0018105 A1    Jan. 16, 2014

(51) Int. Cl.
*H04W 24/00* (2009.01)
*H04W 4/02* (2009.01)
*H04W 4/00* (2009.01)

(52) U.S. Cl.
CPC ............... *H04W 4/02* (2013.01); *H04W 4/008* (2013.01)

(58) Field of Classification Search
CPC .............................. H04W 4/02; H04W 4/008
USPC .......................... 455/456.3; 726/27; 235/375
See application file for complete search history.

(56) References Cited

U.S. PATENT DOCUMENTS

2012/0138671 A1* 6/2012 Gaede .................... G06Q 20/32
235/375
2013/0247218 A1* 9/2013 Jhingan ................... G06F 21/36
726/27

\* cited by examiner

*Primary Examiner* — Amancio Gonzalez
(74) *Attorney, Agent, or Firm* — Loza & Loza, LLP; Hopeton Walker

(57) ABSTRACT

A method and system for a logic-based uniform resource locator resolution are described in which a server may receive a request from a mobile device. The request may be based on a uniform resource locator (URL) obtained by the mobile device from a code, such as a two-dimensional code, or from a proximity device, such as a near field communication target device. In response to the request, the server may communicate to the mobile device URL redirection information for a URL that provides multimedia content comprising an advertisement, a webpage, a video, a virtual card, a phone number, sound, and/or other like information. The URL redirection information may be selected based on a location that corresponds to the code or the proximity device, which may be the location of the mobile device. The URL redirection information may also be selected based on a rotation schedule stored in the server.

37 Claims, 11 Drawing Sheets

METHOD AND SYSTEM FOR LOGIC-BASED UNIFORM RESOURCE LOCATOR RESOLUTION

CROSS-REFERENCE TO RELATED APPLICATIONS/INCORPORATION BY REFERENCE

Not Applicable.

FIELD OF TECHNOLOGY

Certain embodiments of the disclosure relate to data communication. More specifically, certain embodiments of the disclosure relate to a method and system for logic-based uniform resource locator resolution.

BACKGROUND

The information that is obtained by a mobile device from optically scanning an image of a code, such as quick response (QR) code, is static. That is, the information does not change over time. For example, the data encoded in a QR code is fixed once the code is printed on a magazine or on a business card. Similarly, the information a mobile device obtains from a proximity device, such as a near field communication (NFC) target device, is also static since the data stored in the memory of the proximity device does not change after the device is made or assembled. As a result, content that is typically requested and received by the mobile device in response to the information obtained from a code or from a proximity device is also static.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or method is provided for a logic-based uniform resource location resolution, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
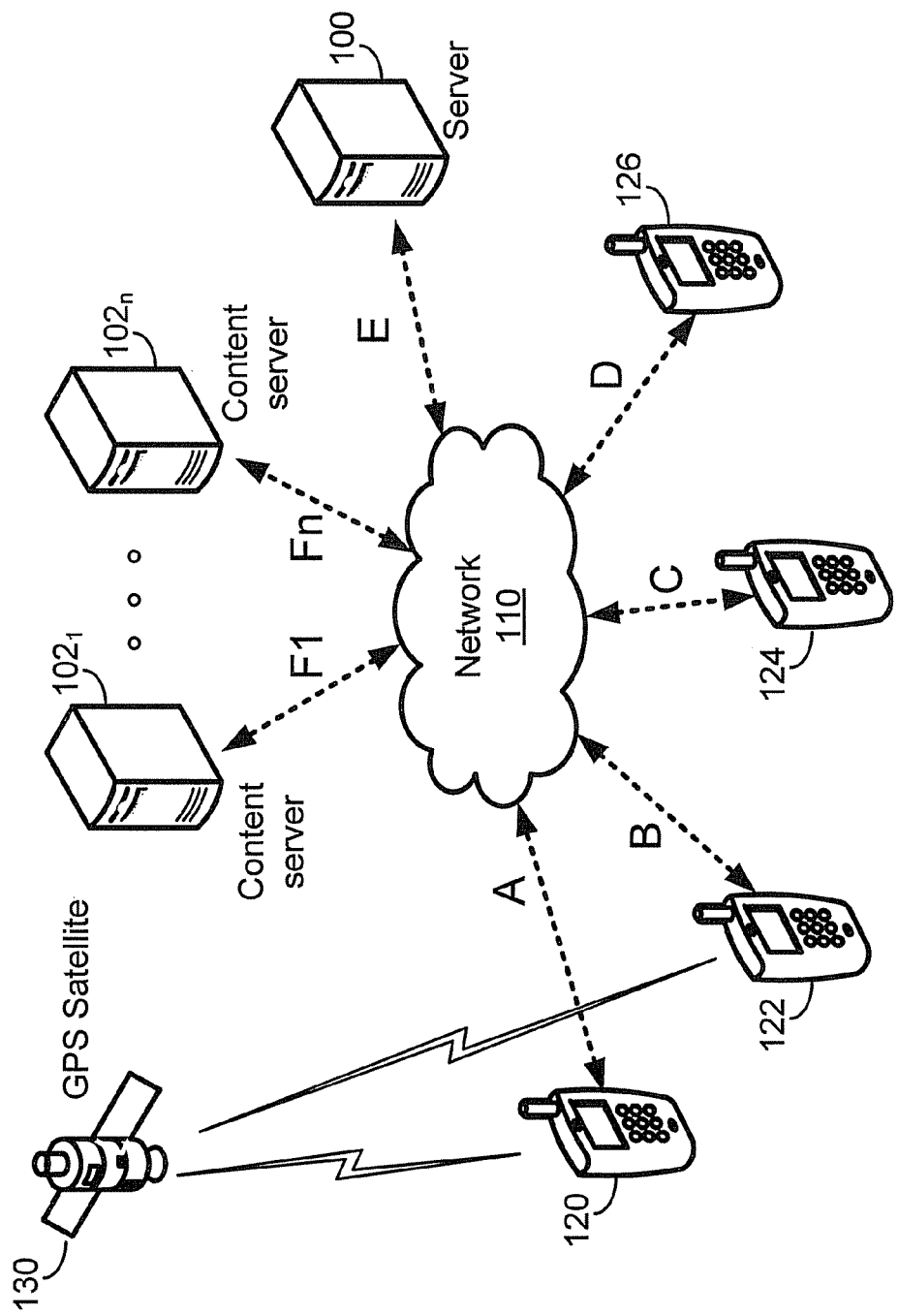
FIG. 1 is a diagram that illustrates an exemplary interaction between various mobile devices and a server for logic-based uniform resource location resolution, in accordance with an embodiment of the invention.

Certain embodiments of the invention may be found in a method and system for a logic-based uniform resource location resolution. Various embodiments of the invention provide for a server that is operable to communicate with one or more mobile devices. The server may receive requests from any one of the mobile devices. A request may be based on a uniform resource locator, or URL, which is received or obtained by a mobile device from, for example, a code or a proximity device. The uniform resource locator may be a shortened uniform resource locator or short alias, such as a TinyURL, for example, which is used for redirection to longer uniform resource locators. The code may be a two-dimensional code or matrix barcode, such as a quick response (QR) code, for example. The code may be designed to encode at least a shortened uniform resource locator. The proximity device may be an electronic tag or a near field communication (NFC) target device, for example. When the proximity device is an NFC target device the mobile device may be operated as an NFC initiator device. The storage capacity of the NFC target device may be sufficient to store at least a shortened uniform resource locator.

In response to the request received from the mobile device, the server may communicate URL redirection or forwarding information to the mobile device. The URL redirection information may correspond to a long URL that may provide multimedia content to the mobile device. The URL redirection information may be determined by the server from the shortened uniform resource locator information comprised in the request sent by the mobile device to the server. The multimedia content provided in connection with the URL redirection information may comprise an advertisement, a webpage, a video, a virtual card, a phone number, sound, and/or other like content. The URL redirection information provided to the mobile device by the server may be based on a location corresponding to the code or to the proximity device. For example, the location may refer to the location of the code or of the proximity device at the time when information comprising the uniform resource locator is received from either of them by the mobile device. In some instances, the location of the code or of the proximity device may be fixed or stationary. In another example, the location may refer to the location of the mobile device at the time the mobile device receives information comprising the uniform resource locator from the code or from the proximity device. In yet another example, the location may refer to the location of the mobile device at the when time the mobile device sends the request to the server, which may be different from the location at the time the uniform resource locator was received by the mobile device.

Once the mobile device has obtained the shortened uniform resource locator from the code or from the proximity device, it may send multiple requests to the server based on the same shortened uniform resource locator. Those requests may occur at different times and/or from different locations. For example, a user of the mobile device may initiate a first request soon after obtaining the shortened uniform resource locator and may subsequently initiate one or more additional requests later that same day or on another day. When the mobile device receives multiple shortened uniform resources locators from various codes and/or proximity devices, the mobile device may send one or more requests to the server for each of the shortened uniform resource locators received.

In one exemplary scenario, the server may communicate to the mobile device URL redirection information corresponding to a URL that provides a first video when the location corresponding to the code or the proximity device is a first location. For example, the first video may be an advertisement of a product that includes a reference to the first location (e.g., beverage "A" ad with "City X" in the background). The server, however, may communicate URL redirection information corresponding to a URL that provides a second video that is different from the first video when the location corresponding to the same code or the same proximity device is a second location that is different from the first location. In this instance, the second video may be an advertisement for the same product described above but the reference in the advertisement is to the second location (e.g., beverage "A" ad with "City Y" in the background). In other words, the video that is obtained by the mobile device for reproduction or display may be different, for the same shortened uniform resource locator, when the location that corresponds to the code or to the proximity device is different.

In another exemplary scenario, the server may communicate to the mobile device URL redirection information corresponding to a URL that provides a first promotional video when the location corresponding to the code or the proximity device is a first location. For example, when the first location is "City X," the server may send URL redirection information corresponding to a URL that provides a promotional video of a television program "A" that indicates that the program is to be shown in "Channel 1." The server, however, may communicate URL redirection information corresponding to a URL that provides a second promotional video that is different from the first promotional video when the location corresponding to the same code or the same proximity device is a second location that is different from the first location. For example, when the second location is "City Y," the server may send URL redirection information corresponding to a URL that provides a promotional video of the television program "A" that indicates that the program is to be shown in "Channel 2." In other words, the promotional video that is obtained by the mobile device for reproduction or display may be different, for the same shortened uniform resource locator, when the location that corresponds to the code or to the proximity device is different.

In yet another exemplary scenario, the server may communicate to the mobile device URL redirection information corresponding to a URL that provides a first webpage or website when the location corresponding to the code or the proximity device is a first location. For example, when the first location is a city in the United States, the server may send URL redirection information corresponding to a URL that provides a United States edition of a sports website. The server, however, may communicate URL redirection information corresponding to a URL that provides a second webpage or website that is different from the first webpage or website when the location corresponding to the same code or the same proximity device is a second location that is different from the first location. For example, when the second location is a city in Europe, Asia, or Latin America, the server may send URL redirection information corresponding to a URL that provides a local or regional edition of the same sports website. In other words, the webpage or website that is obtained by the mobile device for reproduction or display may be different, for the same shortened uniform resource locator, when the location that corresponds to the code or to the proximity device is different.

The server may also be operable to select the URL redirection information that is to be sent to the mobile device from among URL redirection information for multiple long URLs. For example, there may be multiple videos that may be sent to the mobile device for a particular shortened uniform resource locator and the server may perform a logic-based operation to select the URL redirection information that corresponds to the long URL that provides the appropriate one of the videos for communication to the mobile device. As noted above, the selection may be based on the location corresponding to the code or the proximity device. In addition, the selection may be based on, for example, a time corresponding to the reception of the request from the mobile device by the server. Moreover, the selection may be based on a number of requests, for the shortened uniform resource locator, which are received by the server from the same mobile device. In some instances, the selection performed by the server may be a combination of the approaches described above.

When the selection is based on a time corresponding to the reception of the request, the server may compare the request time with a multimedia content rotation schedule stored in the server to determine which is the appropriate multimedia content for the mobile device and to send the corresponding URL redirection information. When the selection is based on the number of requests, the server may select URL redirection information corresponding to a URL that provides certain multimedia content for a first request and, for a second request, the server may select URL redirection information corresponding to a URL that provides a different multimedia content, for example.

The various embodiments and/or exemplary scenarios described above for a logic-based uniform resource location resolution, are described in more detail below in connection with FIGS. 1-9. These embodiments and/or exemplary scenarios, however, are provided by way of illustration and not of limitation.

FIG. 1 is a diagram that illustrates an exemplary interaction between various mobile devices and a server for logic-based uniform resource location resolution, in accordance with an embodiment of the invention. Referring to FIG. 1, there are shown a server 100, content servers $102_1, \ldots, 102_n$, a network 110, and a plurality of mobile devices 120, 122, 124, and 126. The mobile devices may be communicatively coupled to the server 100 and to one or more of the content servers $102_1, \ldots, 102_n$ through the network 110 using communication links A, B, C, and D. Also shown in FIG. 1 is a Global Positioning System (GPS) satellite 130.

Each of the plurality of mobile devices 120, 122, 124, and 126 may comprise suitable logic, circuitry, code, and/or interfaces that are operable to wirelessly communicate with the network 110, the server 100, and/or the content servers $102_1, \ldots, 102_n$. In this regard, each of the mobile devices may support one or more wireless communication standards. The mobile devices may be operable, to scan an image of a code, such as a two-dimensional code, for example, decode the scanned image, and process the information obtained from the decoding of the scanned image. Similarly, the mobile devices may be operable to probe, read, or otherwise communicate with a proximity code and process the information obtained from the proximity code. When the proximity device operates as a target device, such as an NFC target device, for example, the mobile device that interacts with the proximity device may operate as an initiator device. Any one of the mobile devices may be operable to interact with both of a code and a proximity device in the manner described above.

Each of the mobile devices 120, 122, 124, and 126 may be operable to communicate to the server 100 the information that is obtained from the code or the proximity device. For example, when the information comprises a uniform resource locator, such as a shortened uniform resource locator, for example, a mobile device may send a request to the server through the network 110 to obtain URL redirection or forwarding information corresponding to a URL (e.g., long URL) that provides content (e.g., multimedia content) for the mobile device. In this manner, the content received by the mobile device from the long URL corresponds to the shortened uniform resource locator obtained from the code or the proximity device by the mobile device. Moreover, the request sent by the mobile device may comprise the shortened uniform resource locator or some representation of it such as an encoded and/or encrypted version of the shortened uniform resource locator.

Once the long URL is obtained by the mobile device, the mobile device may utilize the long URL to receive content from one or more of the content servers $102_1, \ldots, 102_n$ through the network 110 and be operable to reproduce and/or display the content that is received to a user. In some instances, the information obtained from the code or the proximity device by the mobile device may be encrypted and the mobile device may be operable to decrypt the information with the use of one or more keys in order to prepare the request to the server 100 so that the appropriate long URL may be provided to the mobile device.

The network 110 may comprise suitable logic, circuitry, code, and/or interfaces that are operable to enable communication between one or more of the mobile devices 120, 122, 124, and 126, the server 100, and/or the content servers $102_1, \ldots, 102_n$. While the network 110 communicates with the mobile devices via communication links A, B, C, and D, for example, communication with the server 100 may be carried out through a communication link E, and communication with the content servers $102_1, \ldots, 102_n$ may occur through communication links F1, . . . , Fn, respectively.

Although the network 110 is shown as a single component in FIG. 1, the network 110 need not be a single network. Instead, the network 110 may comprise at least a portion of multiple different networks. In this regard, the different networks may be networks that support different communication standards. In some instances, the network 110 may comprise a wireline portion as well as a wireless portion. For example, the wireline portion may refer to a portion of a broadband network that is operable to interact with the server 100 and/or the content servers $102_1, \ldots, 102_n$, while the wireless portion may refer to a portion of a cellular network that is operable to interact with one or more of the mobile devices 120, 122, 124, and 126.

Location information corresponding to any one of the mobile devices may be determined by the server 100 from an Internet Protocol (IP) address that can be mapped or associated by the server 100 to a particular location, area, or region. The mapping information may be stored in the server 100 and/or may be stored in another device that is accessed by the server 100. In addition, one or more of the mobile devices may receive and process signals from one or more GPS satellites, such as the GPS satellite 130. In the embodiment of the invention shown in FIG. 1, mobile devices 120 and 122 are operable to determine a position fix or other form of location information based at least on the signals received from the GPS satellite 130. Therefore, when communicating a request for content to the server 100 based on information obtained from a code or a proximity device, the mobile devices 120 and 122 may provide information about their respective locations (e.g., position fix) to the server 100 in addition to providing an IP address as noted above.

In some embodiments of the invention, location information may be provided by a cellular network that interacts with the mobile devices. For example, base stations and/or cell towers are typically fixed or stationary and, consequently, their locations are known. The location information of a base station and/or cell tower interacting with a particular mobile device may be provided to the server 100 as corresponding to the mobile device making the request. The accuracy of this location information may be sufficient for some of the logic-based uniform resource location resolution operations performed by the server 100. In some instances, the base station and/or cell tower information may be accessed by the server 100 to map an IP address and, in other instances, the base station and/or cell tower information may be provided to the server 100 by the corresponding mobile device.

The server 100 may comprise suitable logic, circuitry, code, and/or interfaces that may be operable to receive requests or other like communication from any one of the mobile devices 120, 122, 124, and 126, and provide appropriate URL redirection or forwarding information to that device in response to the request or communication. In this regard, the server 100 may be operable to perform logic-based uniform resource location resolution operations. For example, the server 100 may be operable to determine URL redirection information that corresponds to a long URL that provides the appropriate type of content to send to a mobile device for a particular shortened uniform resource locator (e.g., TinyURL) obtained by the mobile device from a code or proximity device. The URL redirection information may be determined based on one or more criterion, including a location corresponding to the code or the proximity device from which the shortened uniform resource locator is obtained. The determination of the URL redirection or forwarding information may be part of the logic-based uniform resource location resolution operations performed by the server 100. Although a single server 100 is described in FIG. 1, the invention need not be so limited. In some instances, more than one server 100 may be used to perform logic-based uniform resource location resolution operations.

The server 100 may also be operable to request, access, obtain, and/or receive location or other type of geographical information (e.g., region, city, neighborhood) that may be associated with the IP address of a mobile device in order to use the location or geographical information as part of the logic-based uniform resource location resolution operations.

In operation, one or more of the mobile devices 120, 122, 124, and 126 may obtain and/or receive information from a code or a proximity device. The information obtained may include a shortened uniform resource locator, which is processed by the mobile device to generate one or more signals that are to be communicated to the server 100 to request a long URL that ma be utilized by the mobile device to obtain content associated with the shortened uniform resource locator. Location information corresponding to the code or proximity device may be communicated to the server 100 as part of the request, or in some instances, separate from the request. The location information may be in the form of IP address field in a HyperText Markup Language (HTML) header. In some instances, the location information may also comprise a position fix determined by the mobile device from GPS operations. The server 100 may process the request from one or more mobile devices and may determine the appropriate URL redirection information that is to be sent to each of the mobile devices. Since the determination may be based on the location information, the server 100 may map the IP address of each of the mobile devices to a location, area, or region that corresponds to the appropriate mobile device and may utilize the location, area, or region when determining the URL redirection information. Each mobile device that made a request may then receive URL redirection information from the server 100 and may reproduce and/or display content obtained using the URL redirection information for user consumption.

Figure 2:
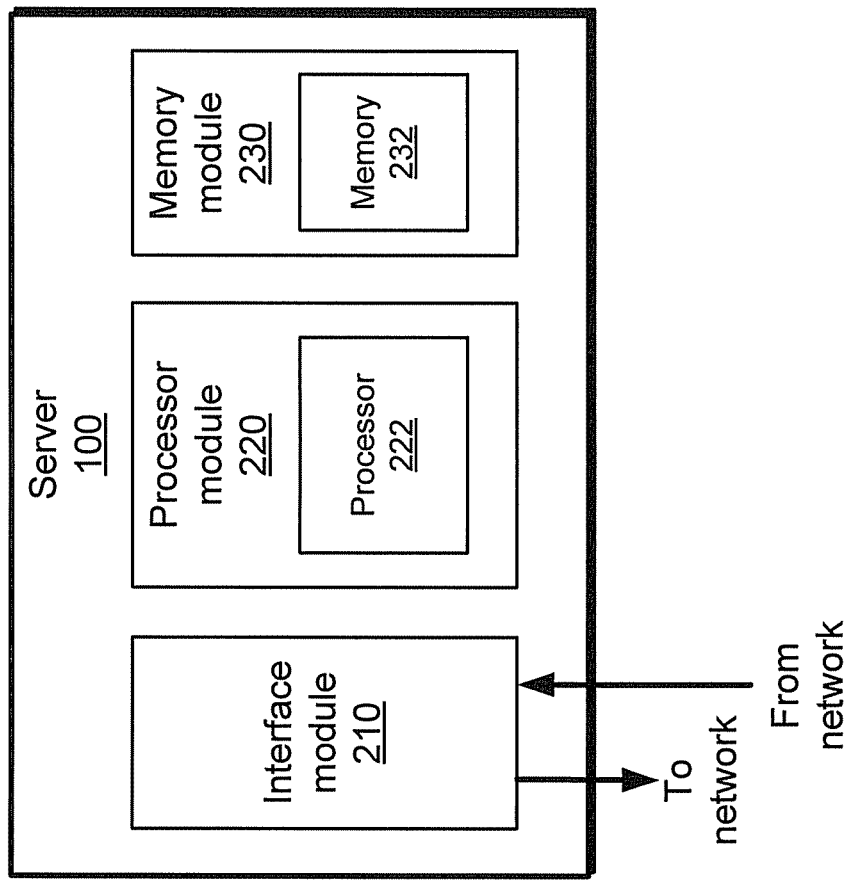
FIG. 2 is a block diagram that illustrates an exemplary server architecture, in accordance with an embodiment of the invention.

FIG. 2 is a block diagram that illustrates an exemplary server architecture, in accordance with an embodiment of the invention. Referring to FIG. 2, there is shown the server 100 of FIG. 1 having an interface module 210, a processor module 220, and a memory module 230. The interface module 210 may comprise suitable logic, circuitry; code, and/or interfaces that may be operable to communicate with the network 110. The interface module 210 may comprise suitable logic, circuitry, code, and/or interfaces that may be operable support more than one standard or protocol to communicate with the network 110, with other networks (not shown), and/or with other resources (not shown).

The processor module 220 may comprise suitable logic, circuitry, code, and/or interfaces that may be operable to process signals, such as requests, for example, received from a mobile device, where the requests are for having URL redirection information corresponding to a shortened uniform resource locator be sent to the mobile device so that the mobile device may obtain content for reproduction and/or display. In connection with the requests, the processor module 220 may also receive and process location information. Based on the received information, the processor module 220 may perform logic-based uniform resource location resolution operations to determine the URL redirection information that is to be communicated to the mobile device. In this regard, the processor module 220 may select the appropriate URL redirection information from information stored in the memory module 230 using one or more criterion. Moreover, the processor module 220 may use a content rotation schedule, which may also be stored in the memory module 230, to determine the appropriate URL redirection information for delivery to the mobile device. The content rotation schedule enables the processor module 220 to select different URL redirection information for delivery according to the order, format, and/or sequence provided in the content rotation schedule. The content rotation schedule may be referred to as a multimedia content rotation schedule when the content corresponding to the schedule is multimedia content. Once the appropriate URL redirection information is determined by the processor module 220, the URL redirection information may be processed and delivered to the mobile device using various delivery formats.

The processor module 220 may be operable to process location information. For example, the processor module 220 may be operable to request, access, obtain, and/or receive location or other type of geographical information (e.g., region, city, neighborhood) to associate such information with the IP address of a mobile device in order to use the location or geographical information as part of logic-based uniform resource location resolution operations performed by the processor module 220.

The processor module 220 may comprise at least one processor 222 that may be operable to handle the processing described above. The processor 222 may be a host processor, a central processing unit (CPU), an application specific integrated circuit (ASIC), for example.

The memory module 230 may comprise suitable logic, circuitry, code, and/or interfaces that may be operable to store URL redirection information (e.g., long URLs) and/or location information (e.g., mapped IP addresses). The memory module 230 may also store a content rotation schedule as described above, which may be updated, modified, and/or adjusted dynamically via the interface module 210 and the network 110. The memory module 230 may comprise one or more memories 232 that are used for storage of the URL redirection information and/or location information. While the memory module 230 is shown as being part of the server 100, the memory module 230 may also be implemented separate from the server 100 as a direct-attached storage device or as a network-attached storage device, for example. Moreover, although a single memory module 230 is described, the invention need not be so limited. In some instances, more than one memory module 230 may be used to store the information described above.

In operation, one or more signals related to a request for URL redirection information corresponding to a shortened uniform resource locator are received from a mobile device via the interface module 210. Location information associated with the request may also be received via the interface module 210 as part of the request or separate from the request. The processor module 220 may process the request and may determine URL redirection information corresponding to a long URL that provides appropriate content for the shortened uniform resource locator. The processor module 220 may select or determine the URL redirection information from URL redirection information available in the memory module 230. Once selected, the URL redirection information may be sent to the mobile device via the interface module 210 and the network 110.

Figure 3A:
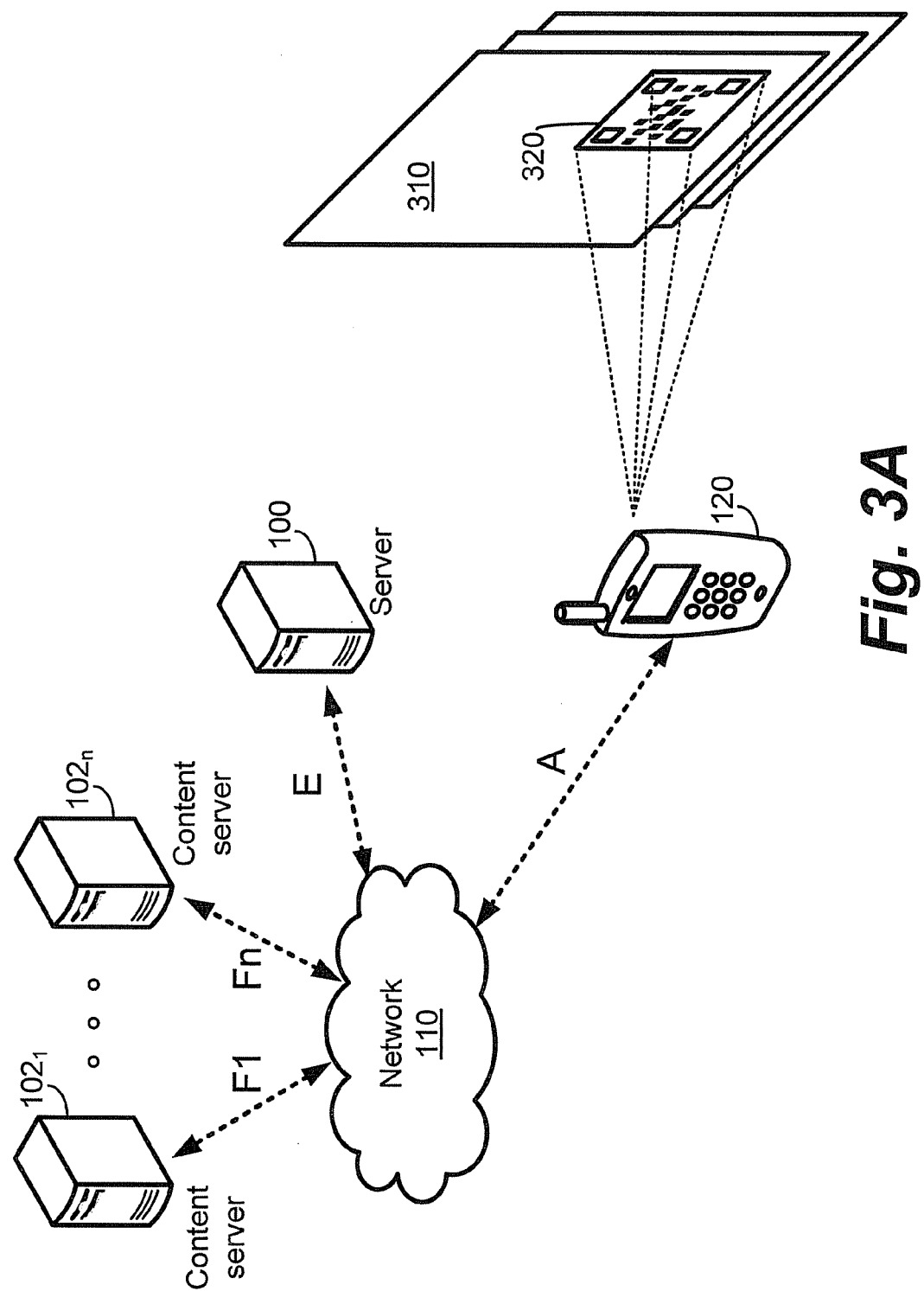
FIG. 3A is a diagram that illustrates an exemplary scenario in which multimedia content is dynamically received by a mobile device after scanning a code in printed media, in accordance with an embodiment of the invention.

FIG. 3A is a diagram that illustrates an exemplary scenario in which multimedia content is dynamically received by a mobile device after scanning a code in printed media, in accordance with an embodiment of the invention. Referring to FIG. 3A, there is shown the server 100, the content servers 102$_1$, . . . , 102$_n$, the network 110, and the mobile device 120 described above with respect to FIG. 1. Also shown is a printed media 310. The printed media 310 may be a publication, magazine, circular, newspaper, or any other like media on which a code 320 may be printed or placed. The printed media 310 need not be stationary. For example, a user of the mobile device 120 may purchase or acquire the printed media 310 in one location and may carry it to another location for use or consumption. Moreover, while the printed media 310 may be different when purchased or acquired in different locations, the code 320 need not change. For example, the printed media 310 may be a newspaper having a local version and an international version. Both versions, however, may use the same code 320 to encode a particular uniform resource locator (e.g., shortened uniform resource locator).

The code 320 may be a two-dimensional code, such as a QR code, for example. The code 320, however, need not be limited to a two-dimensional code and other code types may also be used. The information encoded in the code 320 may comprise a shortened uniform resource locator. For example, when the code 320 is a QR code, it may have encoded as few as six characters to represent a shortened uniform resource locator.

In operation, the mobile device 120 may scan the code 320 using a built-in camera or other like image capture device. The mobile device 120 may decode the information obtained from the code 320 to obtain a shortened uniform resource locator. In this regard, the mobile device 120 may use an application or other software solution to scan and decode the information obtained from the code 320. When the information is encrypted, the same or other application may be used to decrypt the information.

The mobile device 120 may generate one or more signals to request from the server 100 URL redirection information corresponding to the shortened uniform resource locator. In addition to the shortened uniform resource locator or a representation of it, the signals may include header information that comprises an IP address corresponding to the mobile device 120. Moreover, a position fix of the mobile device 120, determined from satellite and/or other signals, may also be provided to the server 100 in connection with the request.

The mobile device 120 communicates the request to the server 100 through network 110 and communication links A and E. The server 100 processes the request using logic-based uniform resource location resolution operations and selects or determines the appropriate URL redirection information to send to the mobile device 120. The mobile device 120 may utilize the URL redirection information to access content associated with a long URL from one or more of the content servers $102_1, \ldots, 102_n$. The content accessed may be multimedia content comprising one or more of an advertisement, a webpage, a video, a virtual card, a phone number, and sound, for example. Once the content is received by the mobile device 120, it is reproduced and/or displayed for user consumption.

Figure 3B:
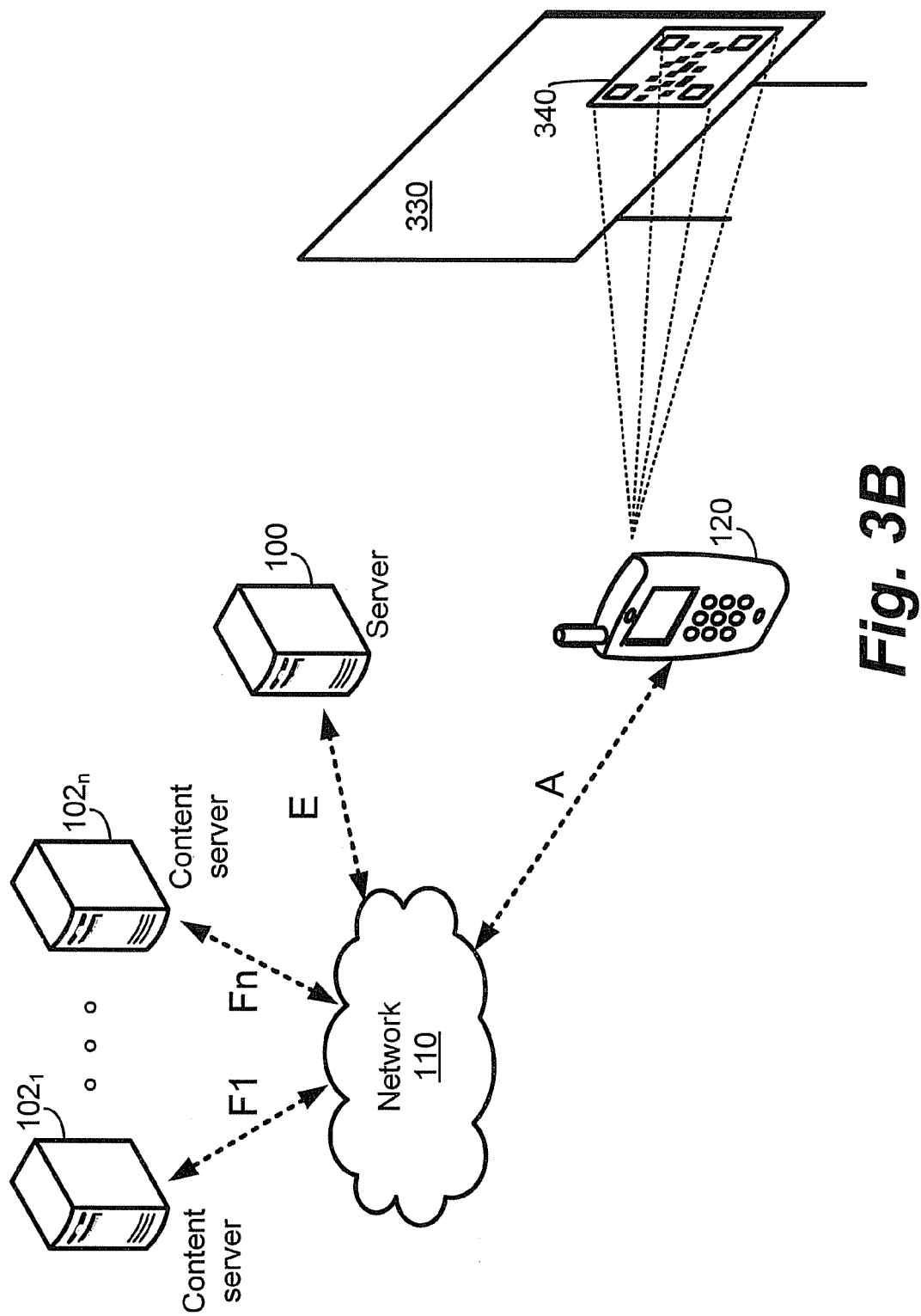
FIG. 3B is a diagram that illustrates an exemplary scenario in which multimedia content is dynamically received by a mobile device after scanning a stationary code, in accordance with an embodiment of the invention.

FIG. 3B is a diagram that illustrates an exemplary scenario in which multimedia content is dynamically received by a mobile device after scanning a stationary code, in accordance with an embodiment of the invention. Referring to FIG. 3B, there is shown the server 100, the content servers $102_1, \ldots, 102_n$, the network 110, and the mobile device 120 described above with respect to FIG. 1. Also shown is a fixed media 330. The fixed media 330 may be billboard, wall display, or any other like stationary media, indoors or outdoors, on which a code 340 may be printed or placed.

The code 340 may be substantially similar to the code 320 described above. When the code 340 is a QR code, for example, having few encoded characters may make the code easier to scan using the image capture capabilities of the mobile device 120 since the fixed media 330 may be at a significant distance from the mobile device 120.

In operation, the mobile device 120 may scan the code 340 and may decode the information obtained from the code 340 to obtain a shortened uniform resource locator. The mobile device 120 may then make one or more requests to the server 100, which in turn provides the appropriate URL redirection information for each request. Once the URL redirection information is received by the mobile device 120, it may access content from a long URL that corresponds to the URL redirection information, and may reproduced and/or displayed the accessed content for user consumption.

Since the code 340 is fixed, the server 100 may have access to mapping or other like information that can be used to associate location information with the particular fixed or stationary code. For example, when two or more different codes are closely placed and fixed, using IP address information from the mobile device 120 may not be able to provide distinguishing information about the location of the codes. Instead, the server 100 may be able to identify the codes as different codes and be able to obtain location information from a local and/or an external database to select or determine the appropriate URL redirection information from each code.

Figure 3C:
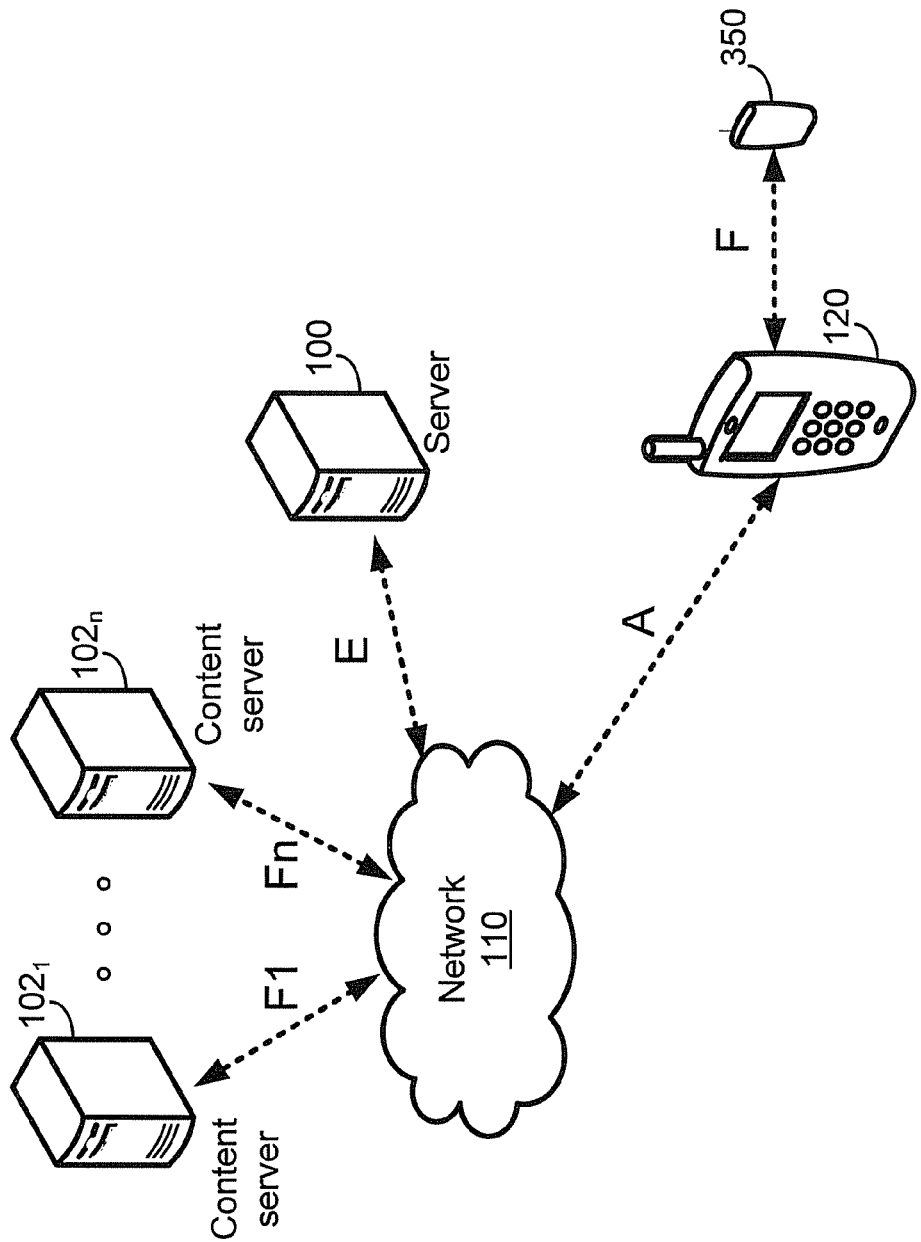
FIG. 3C is a diagram that illustrates an exemplary scenario in which multimedia content is dynamically received by a mobile device after interacting with a proximity device, in accordance with an embodiment of the invention.

FIG. 3C is a diagram that illustrates an exemplary scenario in which multimedia content is dynamically received by a mobile device after interacting with a proximity device, in accordance with an embodiment of the invention. Referring to FIG. 3C, there is shown the server 100, the content servers $102_1, \ldots, 102_n$, the network 110, and the mobile device 120 described above with respect to FIG. 1. Also shown is a proximity device 350. The proximity device 350 may have stored information comprising a shortened uniform resource locator. The mobile device 120 may be used to wirelessly or by contact retrieve, obtain, read, or otherwise obtain the stored information from the proximity device 350. When the proximity device 350 is an NFC target device, the mobile device 120 may be configured as an NFC initiator device in order to interact with proximity device 350.

In operation, the mobile device 120 may obtain stored information from the proximity device 350 using wireless and/or contact capabilities in the mobile device 120. The mobile device 120 may process the information to obtain a shortened uniform resource locator. When the information is encrypted, the mobile device 120 may comprise an application or other software solution to decrypt the information. The mobile device 120 may then make one or more requests for content to the server 100, which in turn provides URL redirection information to the mobile device 120 to access content from an appropriate long URL. Once the content is received by the mobile device 120, it is reproduced and/or displayed for user consumption.

Figure 4:
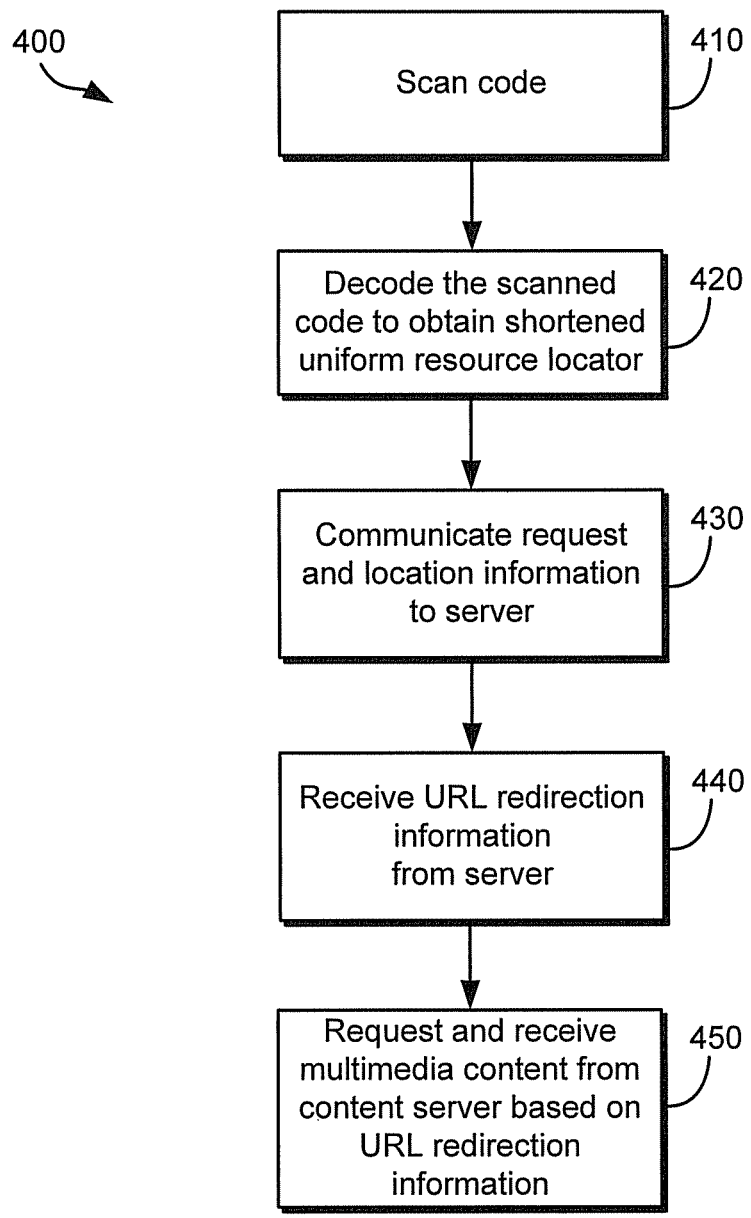
FIG. 4 is a flow diagram that illustrates exemplary steps for receiving multimedia content in a mobile device using a uniform resource locator obtained from a code, in accordance with an embodiment of the invention.

FIG. 4 is a flow diagram that illustrates exemplary steps for receiving multimedia content in a mobile device using a uniform resource locator obtained from a code, in accordance with an embodiment of the invention. Referring to FIG. 4, there is shown a flow chart 400 in which, at step 410, a mobile device, such as the mobile device 120, scans a code that is printed or placed on media. The media onto which the code is printed or placed may be stationary (e.g., billboard) or portable (e.g., magazine).

At step 420, an application and/or other software in the mobile device 120 may be used to decode the scanned image and obtain a uniform resource locator. The uniform resource locator may be a shortened uniform resource locator, for example. At step 430, the mobile device 120 may generate a request corresponding to the code from which the uniform resource locator was obtained. The request is then communicated to the server 100 through the network 110. The request may include or be accompanied by location information. The location information may be, for example, an IP address and/or a position fix. Based on the type of uniform resource locator scanned by the mobile device 120, the server 100 may consider the location information received in the request to refer to the location of the code at the time it was scanned by the mobile device 120, to the location of the mobile device 120 at the time the mobile device 120 scans the code, or to the location of the mobile device 120 at the time it sent the request to the server 100, which may be different from the location at the time the uniform resource locator was obtained by the mobile device 120 from the code. The server 100 may determine which URL redirection or forwarding information to send to the mobile device 120 by performing logic-based uniform resource location resolution operations using the uniform resource locator information in the request, the location information, and/or a content rotation schedule, for example.

At step 440, in response to the request, the mobile device 120 may receive URL redirection information from the server 110. At step 450, the mobile device 120 may access content from a long URL corresponding to the URL redirection information received from the server 100. The content may be multimedia content and may be received from one or more of the content servers $102_1, \ldots, 102_n$, for example. The multimedia content received by the mobile device 120 may comprise an advertisement, a webpage, a video, a virtual card, a phone number, sound, and/or other like content.

In some instances, a user of the mobile device 120 may utilize the mobile device 120 to send multiple requests to the server 100 based on the same uniform resource locator obtained from the code. Those requests may occur at different times and/or from different locations. Therefore, the server 100 may take into consideration the location, the time, and/or the number of requests made when determining the URL redirection information to send to the mobile device 120.

Figure 5:
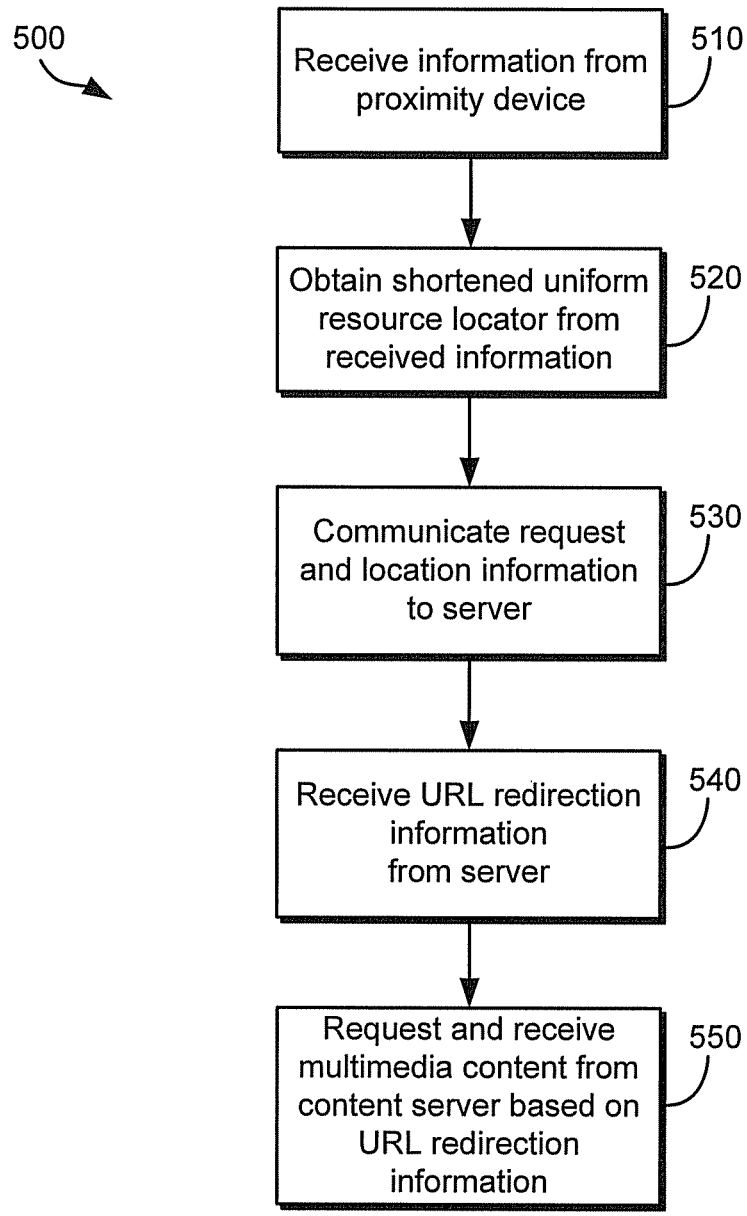
FIG. 5 is a flow diagram that illustrates exemplary steps for receiving multimedia content in a mobile device using a uniform resource locator obtained from a proximity device, in accordance with an embodiment of the invention.

FIG. 5 is a flow diagram that illustrates exemplary steps for receiving multimedia content in a mobile device using a uniform resource locator obtained from a proximity device, in accordance with an embodiment of the invention. Referring to FIG. 5, there is shown a flow chart 500 in which, at step 510, a mobile device, such as the mobile device 120, reads or otherwise obtains stored information from a proximity device, such as the proximity device 350 described above with respect to FIG. 3C.

At step 520, an application and/or other software in the mobile device 120 may be used to process the information received from the proximity device and obtain a uniform resource locator. The uniform resource locator may be a shortened uniform resource locator, for example. At step 530, the mobile device 120 may generate a request corresponding to the proximity device from which the uniform resource locator was obtained. The request is then communicated to the server 100 through the network 110. The request may include or be accompanied by location information. The location information may be, for example, an IP address and/or a position fix. Based on the type of uniform resource locator obtained by the mobile device 120, the server 100 may consider the location information received in the request to refer to the location of the code at the time it was scanned by the mobile device 120, to the location of the mobile device 120 at the time the mobile device 120 scans the code, or to the location of the mobile device 120 at the time it sent the request to the server 100, which may be different from the location at the time the uniform resource locator was obtained by the mobile device 120 from the code. The server 100 may determine which URL redirection or forwarding information to send to the mobile device 120 by performing logic-based uniform resource location resolution operations using the uniform resource locator information in the request, the location information, and/or a content rotation schedule, for example.

At step 540, in response to the request, the mobile device 120 may receive URL redirection information from the server 110. At step 550, the mobile device 120 may access content from a long URL corresponding to the URL redirection information received from the server 100. The content may be multimedia content and may be received from one or more of the content servers $102_1, \ldots, 102_n$, for example. The multimedia content received by the mobile device 120 may comprise an advertisement, a webpage, a video, a virtual card, a phone number, sound, and/or other like content.

In some instances, a user of the mobile device 120 may use the mobile device 120 to send multiple requests to the server 100 based on the same uniform resource locator obtained from the proximity device. Those requests may occur at different times and/or from different locations. Therefore, the server 100 may take into consideration the location, the time, and/or the number of requests made when determining the URL redirection information to send to the mobile device 120.

Figure 6:
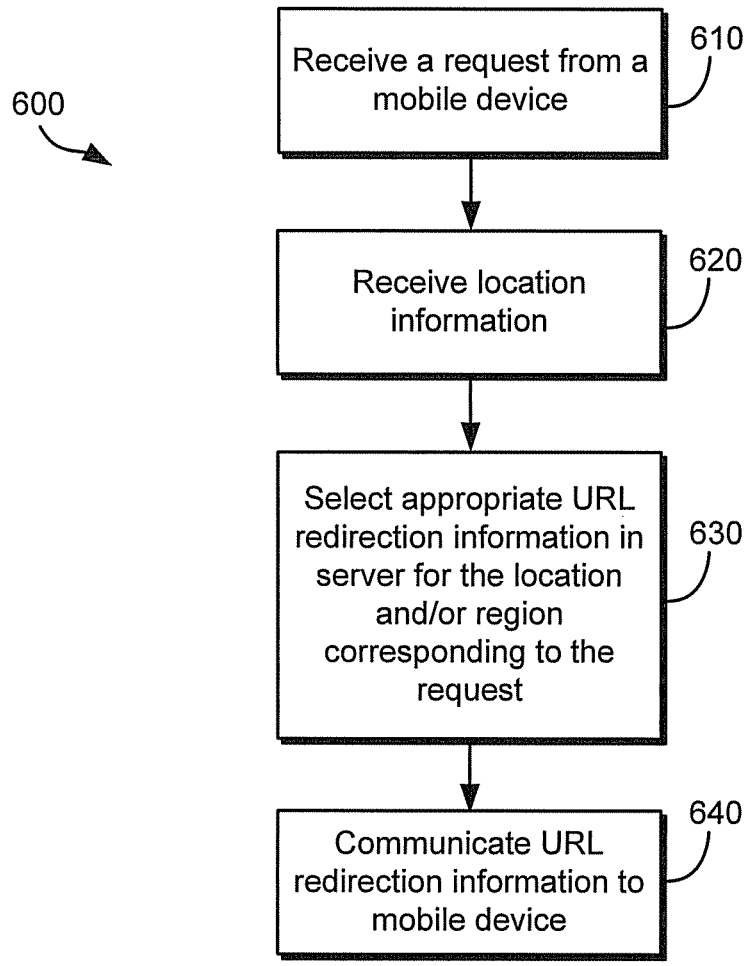
FIGS. 6-8 are flow diagrams that illustrate exemplary steps for logic-based uniform resource location resolution operations in a server, in accordance with an embodiment of the invention.
Figure 7:
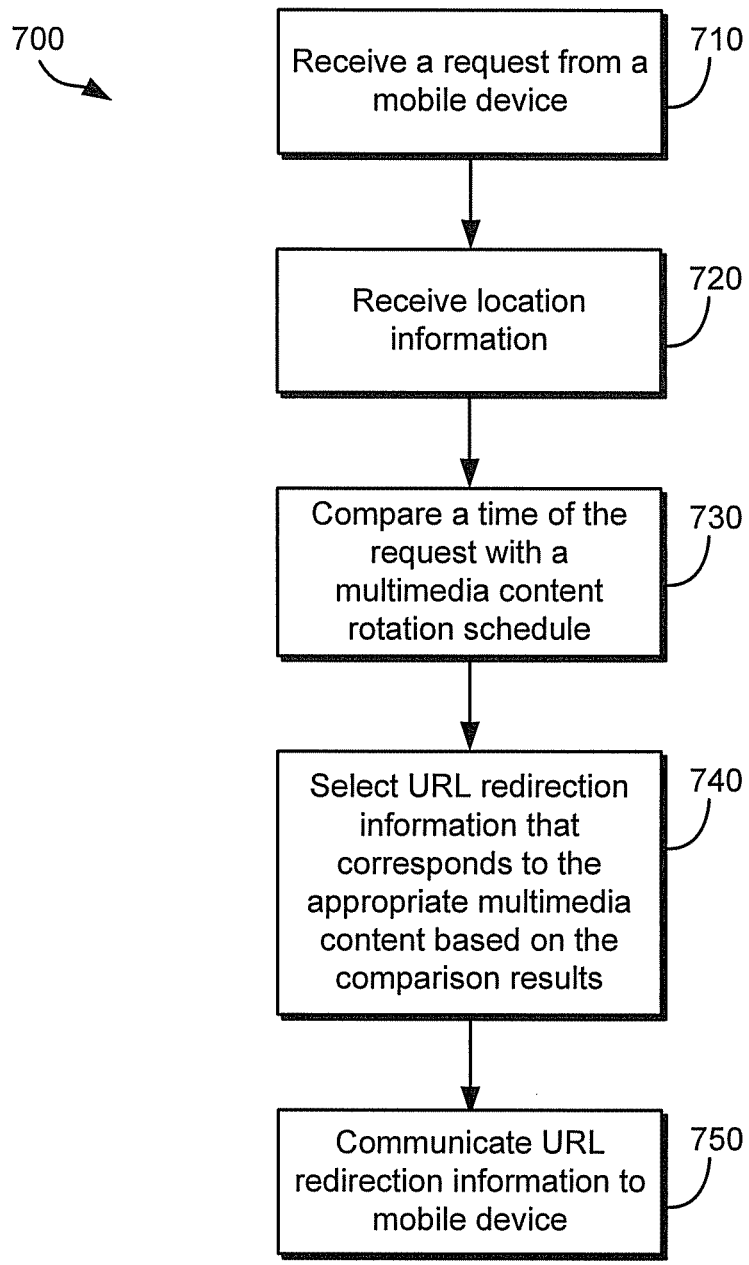
Figure 8:
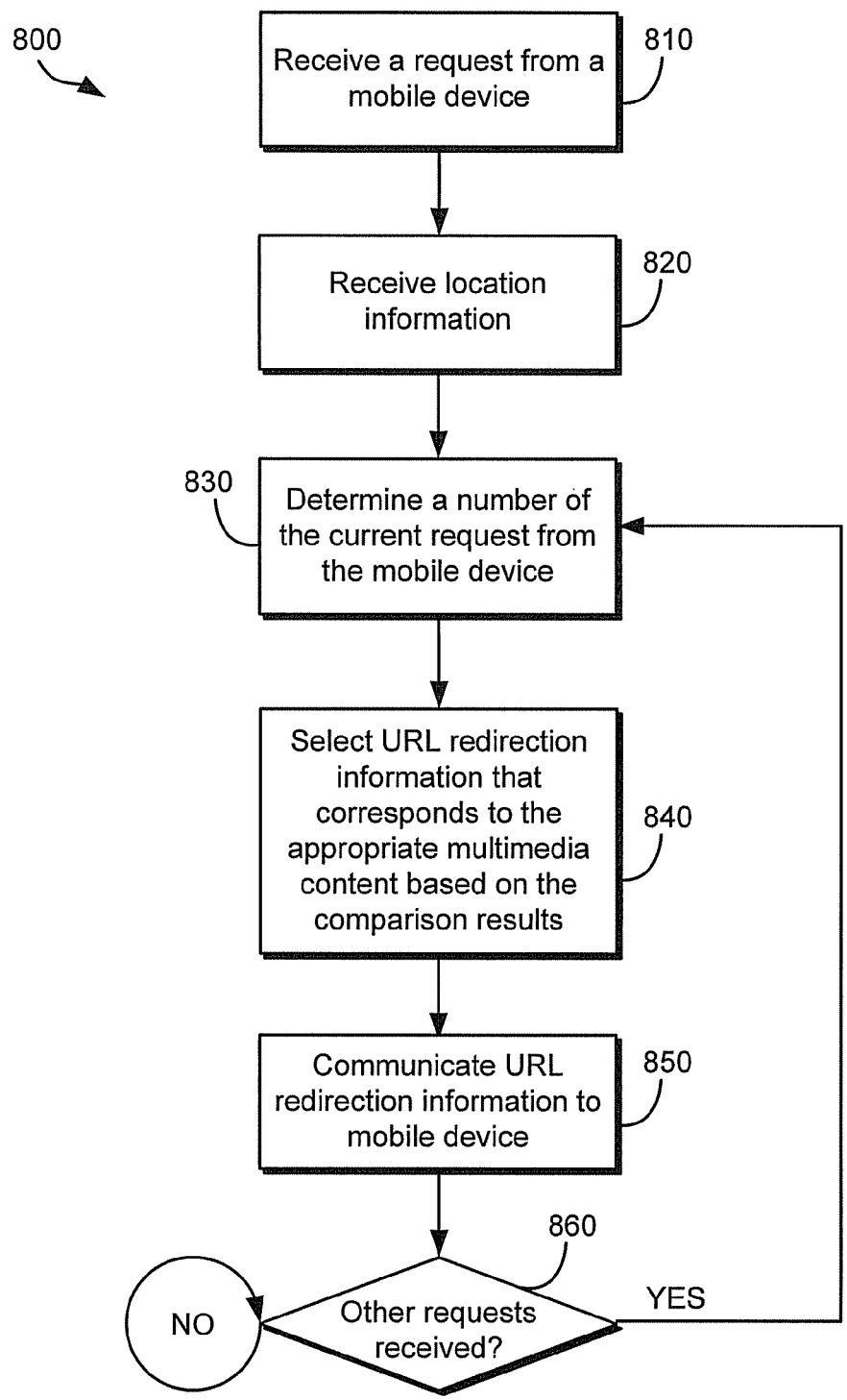

FIGS. 6-8 are flow diagrams that illustrate exemplary steps for logic-based uniform resource location resolution operations in a server, in accordance with an embodiment of the invention. Referring to FIG. 6, there is shown a flow chart 600 in which, at step 610, a server, such as the server 100, may receive a request from a mobile device for URL redirection information for a particular shortened uniform resource locator obtained by the mobile device from a code or proximity device. At step 620, the server 100 also receives location information from the mobile device. As described above, the location information corresponds to a location associated with the code or the proximity device from which the shortened uniform resource locator was obtained by the mobile device. In some instances, the location information may be received as part of the request in step 610.

At step 630, the server 100 may select or determine the appropriate URL redirection information for the location corresponding to the uniform resource locator in the request. In this regard, the server 100 may select one of several possible URL redirections for a particular uniform resource locator based on the location or region. For example, for the same shortened uniform resource locator in a request, when the server 100 receives a request corresponding to a "City X" in "Region 1", the URL redirection information (e.g., long URL) that is selected may be different from that of a request corresponding to a "City Y" in the same region, that is, "Region 1". In another example, for the same shortened uniform resource locator, when the server 100 receives a request corresponding to "Region 1", the URL redirection information (e.g., long URL) that is selected may be different from that of a request corresponding to "Region 2" that is different from "Region 1". The regions of the previous examples may refer to different geographic areas that need not be constrained or be limited by size and/or overlapping.

At step 640, once the appropriate URL redirection information is selected for the mobile device that originated the request, the server 100, through the network 110, for example, may communicate the URL redirection information to that mobile device.

Referring to FIG. 7, there is shown a flow chart 700 in which, at step 710, a server, such as the server 100, may receive a request from a mobile device for URL redirection information corresponding to a particular shortened uniform resource locator obtained by the mobile device from a code or proximity device. At step 720, the server 100 also receives location information from the mobile device. As described above, the location information may correspond to a location associated with the code or the proximity device from which the shortened uniform resource locator was obtained by the mobile device. In some instances, the location information may be received as part of the request in step 710.

At step 730, the server 100 may compare a time of the request received from the mobile device with a multimedia content rotation schedule. The multimedia content rotation schedule comprises information as to how different types of multimedia content are to be rotated over time for a particular uniform resource locator. That is, the appropriate multimedia content for a uniform resource locator is not temporally static but changes in accordance with the content rotation schedule. Associated with such a rotation are different long URLs that may be provided to the mobile device by the server 100 to enable the mobile device to access the appropriate multimedia content from a content server.

At step 740, the server 100 may select the appropriate URL redirection information for communication to the mobile device based on the location information received and on the comparison of the request time with the multimedia content rotation schedule. At step 750, once the appropriate URL redirection information is selected or determined for the mobile device that originated the request, the server 100, through the network 110, for example, may communicate the URL redirection information to that mobile device.

Referring to FIG. 8, there is shown a flow chart 800 in which, at step 810, a server, such as the server 100, may receive a request from a mobile device for URL redirection information that corresponds to a particular shortened uniform resource locator obtained by the mobile device from a code or a proximity device. At step 820, the server 100 also receives location information from the mobile device. As described above, the location information corresponds to a location associated with the code or the proximity device from which the shortened uniform resource locator was obtained by the mobile device. In some instances, the location information may be received as part of the request in step 810.

At step 830, the server 100 may determine the number of times that a request has been made by the same mobile device for URL redirection information corresponding to a particular shortened uniform resource locator. In this regard, the server 100 may store a counter value or other like information that indicates the number of times the same mobile device has made a request associated with a particular shortened uniform resource locator. The server 100 may store multiple counter values for a mobile device when requests related to different shortened uniform resource locators are received by the server 100 from the same mobile device or from multiple mobile devices. For any mobile device and particular shortened uniform resource locator, the counter value may be initialized to zero before any request is received and may be incremented by one after each related request is received by the server 100.

At step 840, the server 100 may select or determine the appropriate URL redirection information to be communicated to the mobile device based on at least the current counter value corresponding to the shortened uniform resource locator of the current request. The selection may also be based on the location information received in step 820. At step 850, once the appropriate URL redirection information is selected for the mobile device that originated the request, the server 100, through the network 110, for example, may communicate the URL redirection information to that mobile device.

At step 860, the server 100 may determine whether another request is received from the same mobile device and for the same shortened uniform resource locator. When no additional requests are received, the process may return back to step 860 until another request is received. If an additional request is received, the process may return to step 830 where the counter value corresponding to the mobile device and the shortened uniform resource locator is incremented and the server 100 may determine the appropriate URL redirection information to send to the mobile device for the current request.

Figure 9:
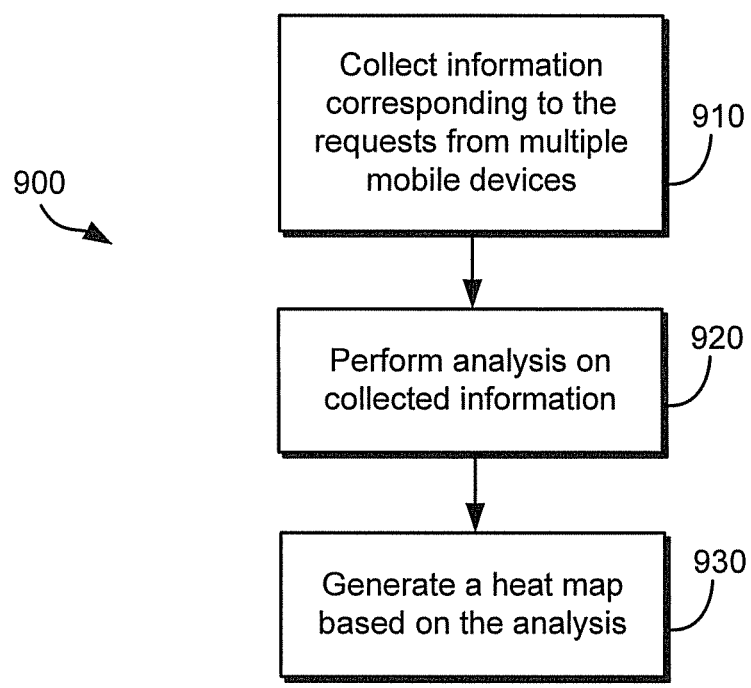
FIG. 9 is a flow diagram that illustrates exemplary steps for generating analytics corresponding to requests received by a server from multiple mobile devices, in accordance with an embodiment of the invention.

FIG. 9 is a flow diagram that illustrates exemplary steps for generating analytics corresponding to requests received by a server from multiple mobile devices, in accordance with an embodiment of the invention. Referring to FIG. 9, there is shown a flow chart 900 in which, at step 910, a server, such as the server 100, may collect information related to requests received from multiple mobile devices. For example, the server 100 may collect information comprising uniform resource locator information, location information, time information of requests, number of requests information, and/or URL redirection information delivered to the mobile devices.

At step 920, the server 100 may analyze the collected information in accordance with one or more requests for such analysis received through the interface module 210. At step 930, the server 100 may produce or generate a report that comprises the results from the analysis. In some instances, the report may comprise a heat map or other similar graphical representation that indicates the frequency of certain requests and/or the frequency of certain URL redirection information for specified areas, regions, or locations of interest during a specified period of time.

In some embodiments of the invention, the server 100 may be operable to communicate with one or more of the mobile devices 120, 122, 124, and 126 shown in FIG. 1. The server 100 may receive requests from any one of the mobile devices, such as the mobile device 120. A request may be based on a uniform resource locator that is received or obtained by the mobile device 120 from, for example, one of the codes 320 and 340, or the proximity device 350. The uniform resource locator may be a shortened uniform resource locator or short alias, such as a TinyURL, for example, which is used for redirection to longer uniform resource locators. The codes 320 and 340 may be two-dimensional codes or matrix barcodes, such as a QR codes, for example. The codes 320 and 340 may be designed to encode at least a shortened uniform resource locator. The proximity device 350 may be an electronic tag or an NFC target device, for example. When the proximity device 350 is an NFC target device the mobile device 120 may be operated as an NFC initiator device. The storage capacity of the NFC target device may be sufficient to store at least a shortened uniform resource locator.

In response to the request received from the mobile device 120, the server 100 may communicate URL redirection information to the mobile device 120. The URL redirection information may correspond to a long URL that provides multimedia content to the mobile device 120, wherein the multimedia content may comprise an advertisement, a webpage, a video, a virtual card, a phone number, sound, and/or other like content. The multimedia content may be provided from one or more of the content servers $102_1, \ldots, 102_n$, when the mobile device 120 utilizes the URL redirection information provided by the server 100. The URL redirection information may be selected by the server 100 based on a location corresponding to the codes 320 and 340, or to the proximity device 350. For example, the location may refer to the location of the codes 320 and 340, or of the proximity device 350, at the time information comprising the uniform resource locator is received from either of them by the mobile device 120. In some instances, the location of the codes 320 and 340, or of the proximity device 350, may be fixed or stationary. In another example, the location may refer to the location of the mobile device 120 at the time the mobile device 120 receives information comprising the uniform resource locator from the code or from the proximity device. In yet another example, the location may refer to the location of the mobile device 120 at the time the mobile device 120 sends the request to the server 100, which may be different from the location at the time the uniform resource locator was received by the mobile device 120.

Once the mobile device 120 has obtained the shortened uniform resource locator from a code or proximity device, it may send multiple requests to the server 100 based on the same shortened uniform resource locator. Those requests may occur at different times and/or from different locations. For example, a user of the mobile device 120 may initiate a first request soon after obtaining the shortened uniform resource locator and may subsequently initiate one or more additional requests some time later. When the mobile device 120 receives multiple shortened uniform resources locators from various codes and/or proximity devices, the mobile device 120 may send one or more requests to the server 100 for each of the shortened uniform resource locators received.

In other embodiments of the invention, the server 100 may consider device type (e.g., form factor for phone, tablet) as well as the network provider/carrier when determining or selecting the URL redirection information that is to be provided to a mobile device. For example, when both a mobile phone and a tablet device capture the same shortened uniform resource locator from a code or proximity device, the URL redirection information provided to the mobile phone by the server 100 may be different from the URL redirection information provided to the tablet device. Similarly, when two mobile phones with the same form factor but having different network providers/carriers make requests to the server 100 based on the same shortened uniform resource locator from a code or proximity device, the URL redirection information provided to the mobile phone using one network provider/carrier may be different from the URL redirection information provided to the mobile phone using a different network provider/carrier. These features may be supported by the processor module 220 shown in FIG. 2 and may be utilized in connection with the various scenarios and examples described in FIGS. 3A-9.

Another embodiment of the invention may provide a non-transitory machine and/or computer readable storage and/or media, having stored thereon, a machine code and/or a computer program having at least one code section executable by a machine and/or a computer, thereby causing the machine and/or computer to perform the steps as described herein for a logic-base uniform resource location resolution.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in a server that is operable to communicate with a mobile device:
   receiving a request from the mobile device, the request being based on a uniform resource locator (URL) received by the mobile device from a code;
   communicating URL redirection information to the mobile device in response to the request, the URL redirection information being based on a location corresponding to the code; and
   selecting at the server, a URL that corresponds to the URL redirection information from a plurality of URLs, the selection being based on a time corresponding to the reception of the request by the server.

2. The method of claim 1, wherein the location corresponding to the code is the location of the mobile device at a time of reception of the URL by the server.

3. The method of claim 1, wherein the URL redirection information corresponds to a URL that provides multimedia content comprising an advertisement, a webpage, a video, a virtual card, a phone number, sound, or a combination thereof.

4. The method of claim 1, comprising:
   communicating to the mobile device, when the location corresponding to the code is a first location, the URL redirection information corresponding to a URL that provides multimedia content comprising a first video; and
   communicating to the mobile device, when the location corresponding to the code is a second location different from the first location, the URL redirection information corresponding to a URL that provides multimedia content comprising a second video different from the first video.

5. The method of claim 1, comprising:
   communicating to the mobile device, when the location corresponding to the code is a first location, the URL redirection information corresponding to a URL that provides multimedia content comprising a first promotional video of a program; and
   communicating to the mobile device, when the location corresponding to the code is a second location different from the first location, the URL redirection information corresponding to a URL that provides multimedia content comprising a second promotional video of the program different from the first promotional video of the program.

6. The method of claim 1, comprising:
   communicating to the mobile device, when the location corresponding to the code is a first location, the URL redirection information corresponding to a URL that provides multimedia content comprising a first webpage; and
   communicating to the mobile device, when the location corresponding to the code is a second location different from the first location, the URL redirection information corresponding to a URL that provides multimedia content comprising a second webpage different from the first webpage.

7. The method of claim 1, comprising receiving from the mobile device, information comprising an indication of the location of the mobile device at a time of reception of the URL by the mobile device.

8. The method of claim 1, wherein the code is a two-dimensional code.

9. The method of claim 1, wherein the code is a quick response code.

10. The method of claim 1, wherein the selection comprises comparing a multimedia content rotation schedule stored in the server with a time corresponding to the reception of the request by the server.

11. The method of claim 10, comprising dynamically modifying one or both of the multimedia content rotation schedule and the plurality of URLs.

12. The method of claim 1, comprising selecting a URL that corresponds to the URL redirection information from a plurality of URLs, the selection being based on a number of separate requests received from the mobile device, each of the separate requests being based on the URL received by the mobile device from the code.

13. A system, comprising:
one or more circuits for use in a server that is operable to communicate with a mobile device;
the one or more circuits being operable to receive a request from the mobile device, the request being based on a uniform resource locator (URL) received by the mobile device from a code;
the one or more circuits being operable to communicate URL redirection information to the mobile device in response to the request, the URL redirection information being based on a location corresponding to the code; and
the one or more circuits being operable to select at the server, a URL that corresponds to the URL redirection information from a plurality of URLs, the selection being based on a time corresponding to the reception of the request by the server.

14. The system of claim 13, wherein the location corresponding to the code is the location of the mobile device at a time of reception of the URL by the server.

15. The system of claim 13, wherein the URL redirection information corresponds to a URL that provides multimedia content comprising an advertisement, a webpage, a video, a virtual card, a phone number, sound, or a combination thereof.

16. The system of claim 13, wherein the one or more circuits are operable to:
communicate to the mobile device, when the location corresponding to the code is a first location, the URL redirection information corresponding to a URL that provides multimedia content comprising a first video; and
communicate to the mobile device, when the location corresponding to the code is a second location different from the first location, the URL redirection information corresponding to a URL that provides multimedia content comprising a second video different from the first video.

17. The system of claim 13, wherein the one or more circuits are operable to:
communicate to the mobile device, when the location corresponding to the code is a first location, the URL redirection information corresponding to a URL that provides multimedia content comprising a first promotional video of a program; and
communicate to the mobile device, when the location corresponding to the code is a second location different from the first location, the URL redirection information corresponding to a URL that provides multimedia content comprising a second promotional video of the program different from the first promotional video of the program.

18. The system of claim 13, wherein the one or more circuits are operable to:
communicate to the mobile device, when the location corresponding to the code is a first location, the URL redirection information corresponding to a URL that provides multimedia content comprising a first webpage; and
communicate to the mobile device, when the location corresponding to the code is a second location different from the first location, the URL redirection information corresponding to a URL that provides multimedia content comprising a second webpage different from the first webpage.

19. The system of claim 13, wherein the one or more circuits are operable to receive from the mobile device, information comprising an indication of the location of the mobile device at a time of reception of the URL by the mobile device.

20. The system of claim 13, wherein the code is a two-dimensional code.

21. The system of claim 13, wherein the code is a quick response code.

22. The system of claim 13, wherein:
the one or more circuits comprise a memory; and
the selection comprises comparing a multimedia content rotation schedule stored in the memory with a time corresponding to the reception of the request by the server.

23. The system of claim 22, wherein the one or more circuits are operable to dynamically modify one or both of the multimedia content rotation schedule and the plurality of URLs.

24. The system of claim 13, wherein the one or more circuits are operable to select a URL that corresponds to the URL redirection information from a plurality of URLs, the selection being based on a number of separate requests received from the mobile device, each of the separate requests being based on the URL received by the mobile device from the code.

25. A non-transitory computer-readable media having stored thereon a computer program having at least one code section for processing data, the at least one code section being executable by a computer to cause the computer to perform steps comprising:
in a server that is operable to communicate with a mobile device:
receiving a request from the mobile device, the request being based on a uniform resource locator (URL) received by the mobile device from a code;
communicating URL redirection information to the mobile device in response to the request, the URL redirection information being based on a location corresponding to the code; and
selecting at the server, a URL that corresponds to the URL redirection information from a plurality of URLs, the selection being based on a time corresponding to the reception of the request by the server.

26. The non-transitory computer-readable of claim 25, wherein the location corresponding to the code is the location of the mobile device at a time of reception of the URL by the server.

27. The non-transitory computer-readable of claim 25, wherein the URL redirection information corresponds to a URL that provides multimedia content comprising an advertisement, a webpage, a video, a virtual card, a phone number, sound, or a combination thereof.

28. The non-transitory computer-readable of claim 25, wherein the at least one code section comprises code for:
communicating to the mobile device, when the location corresponding to the code is a first location, the URL redirection information corresponding to a URL that provides multimedia content comprising a first video; and
communicating to the mobile device, when the location corresponding to the code is a second location different from the first location, the URL redirection information corresponding to a URL that provides multimedia content comprising a second video different from the first video.

29. The non-transitory computer-readable of claim 25, wherein the at least one code section comprises code for:
communicating to the mobile device, when the location corresponding to the code is a first location, the URL redirection information corresponding to a URL that provides multimedia content comprising a first promotional video of a program; and
communicating to the mobile device, when the location corresponding to the code is a second location different from the first location, the URL redirection information corresponding to a URL that provides multimedia content comprising a second promotional video of the program different from the first promotional video of the program.

30. The non-transitory computer-readable of claim 25, wherein the at least one code section comprises code for:
communicating to the mobile device, when the location corresponding to the code is a first location, the URL redirection information corresponding to a URL that provides multimedia content comprising a first webpage; and
communicating to the mobile device, when the location corresponding to the code is a second location different from the first location, the URL redirection information corresponding to a URL that provides multimedia content comprising a second webpage different from the first webpage.

31. The non-transitory computer-readable of claim 25, wherein the at least one code section comprises code for receiving from the mobile device, information comprising an indication of the location of the mobile device at a time of reception of the URL by the mobile device.

32. The non-transitory computer-readable of claim 25, wherein the code is a two-dimensional code.

33. The non-transitory computer-readable of claim 25, wherein the code is a quick response code.

34. The non-transitory computer-readable of claim 25, wherein the selection comprises comparing a multimedia content rotation schedule stored in the server with a time corresponding to the reception of the request by the server.

35. The non-transitory computer-readable of claim 34, wherein the at least one code section comprises code for dynamically modifying one or both of the multimedia content rotation schedule and the plurality of URLs.

36. The non-transitory computer-readable of claim 25, wherein the at least one code section comprises code for selecting a URL that corresponds to the URL redirection information from a plurality of URLs, the selection being based on a number of separate requests received from the mobile device, each of the separate requests being based on the URL received by the mobile device from the code.

37. A method, comprising:
in a server that is operable to communicate with a mobile device:
receiving a request from the mobile device, the request being based on a uniform resource locator (URL) received by the mobile device from a proximity device;
communicating URL redirection information to the mobile device in response to the request, the URL redirection information being based on a location corresponding to the proximity device; and
selecting at the server, a URL that corresponds to the URL redirection information from a plurality of URLs, the selection being based on a time corresponding to the reception of the request by the server.

* * * * *